F. PLATTO.
MOTOR LOADING MACHINE.
APPLICATION FILED JUNE 6, 1919.
1,379,039.
Patented May 24, 1921.
7 SHEETS—SHEET 5.
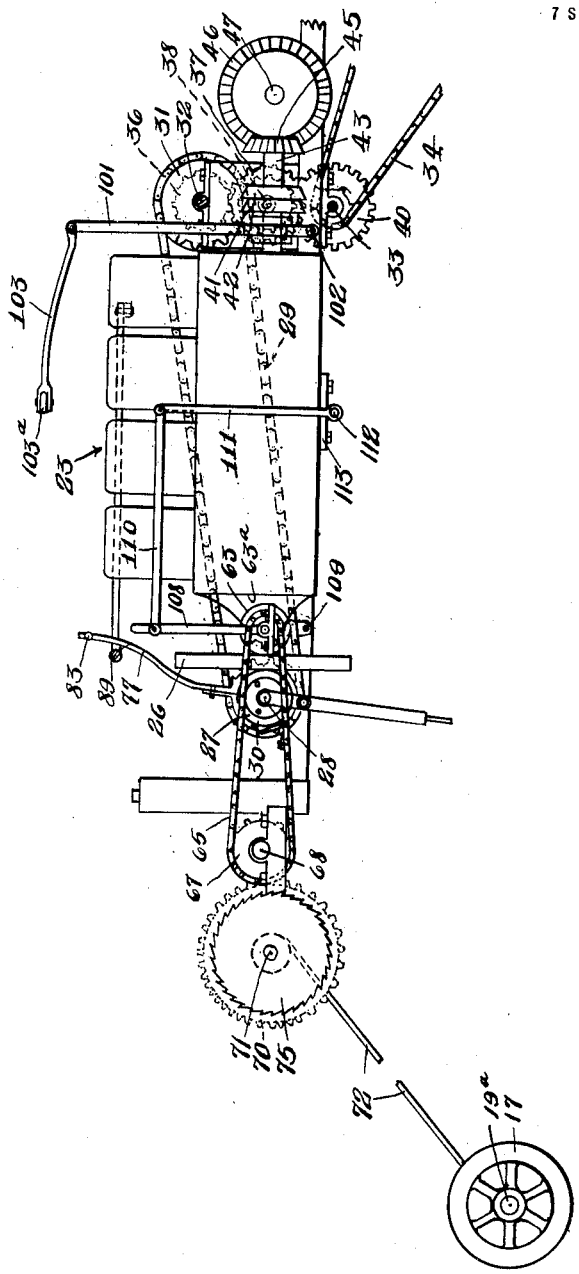

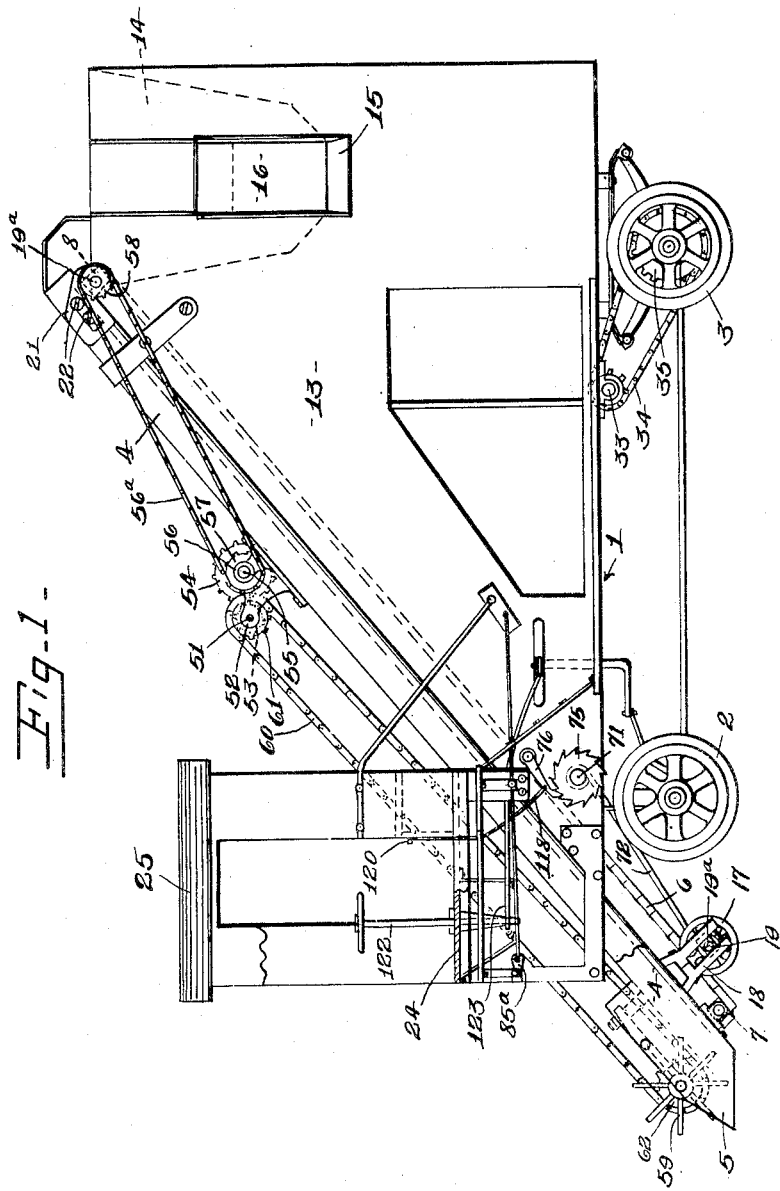

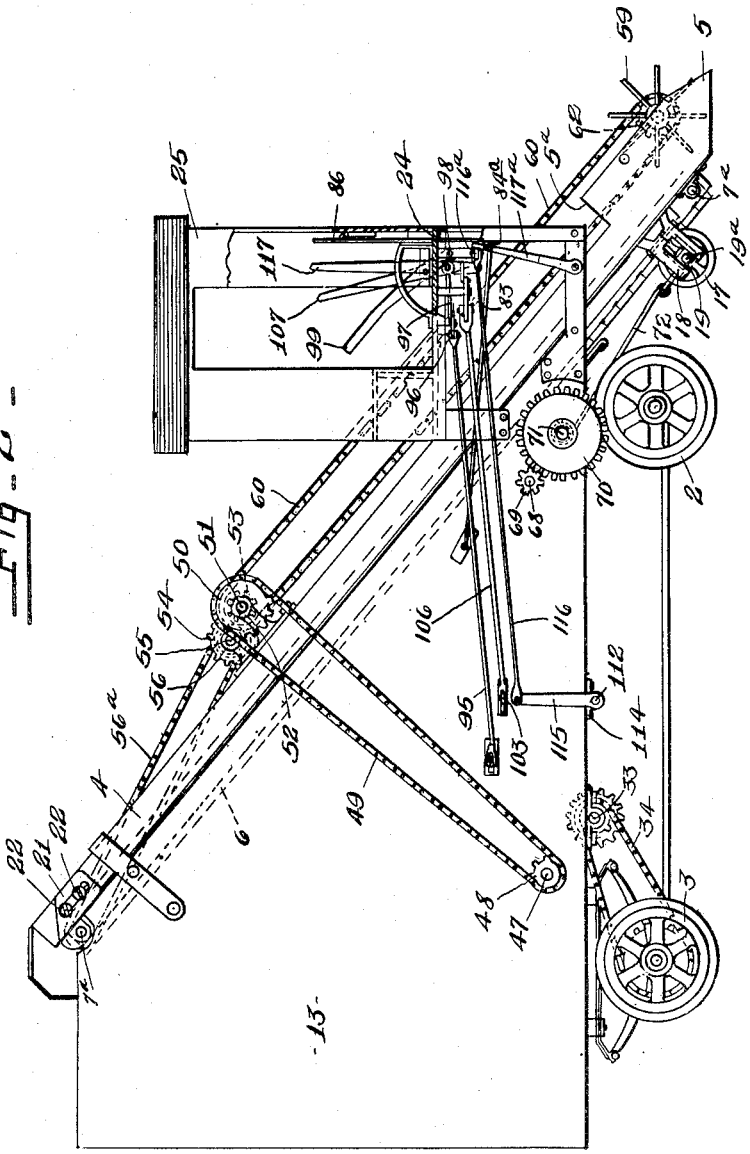

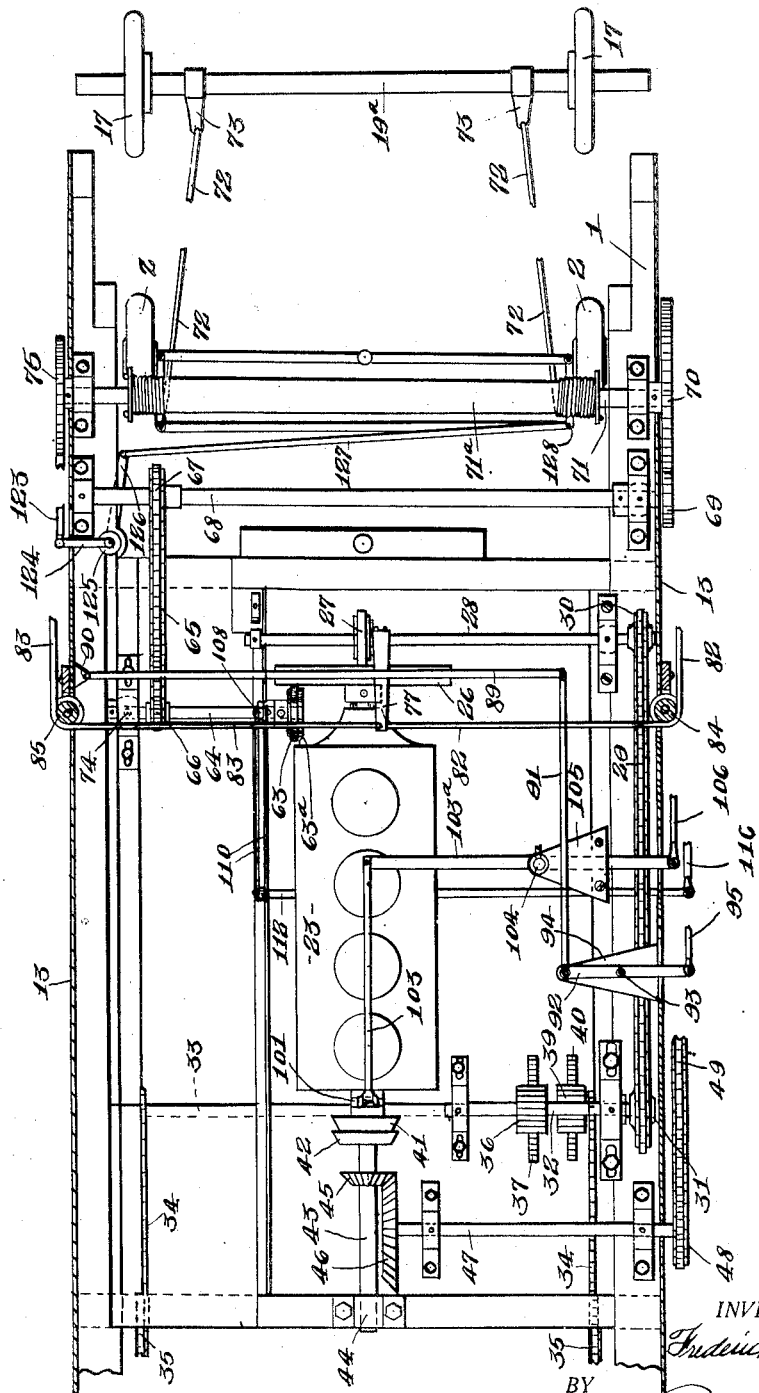

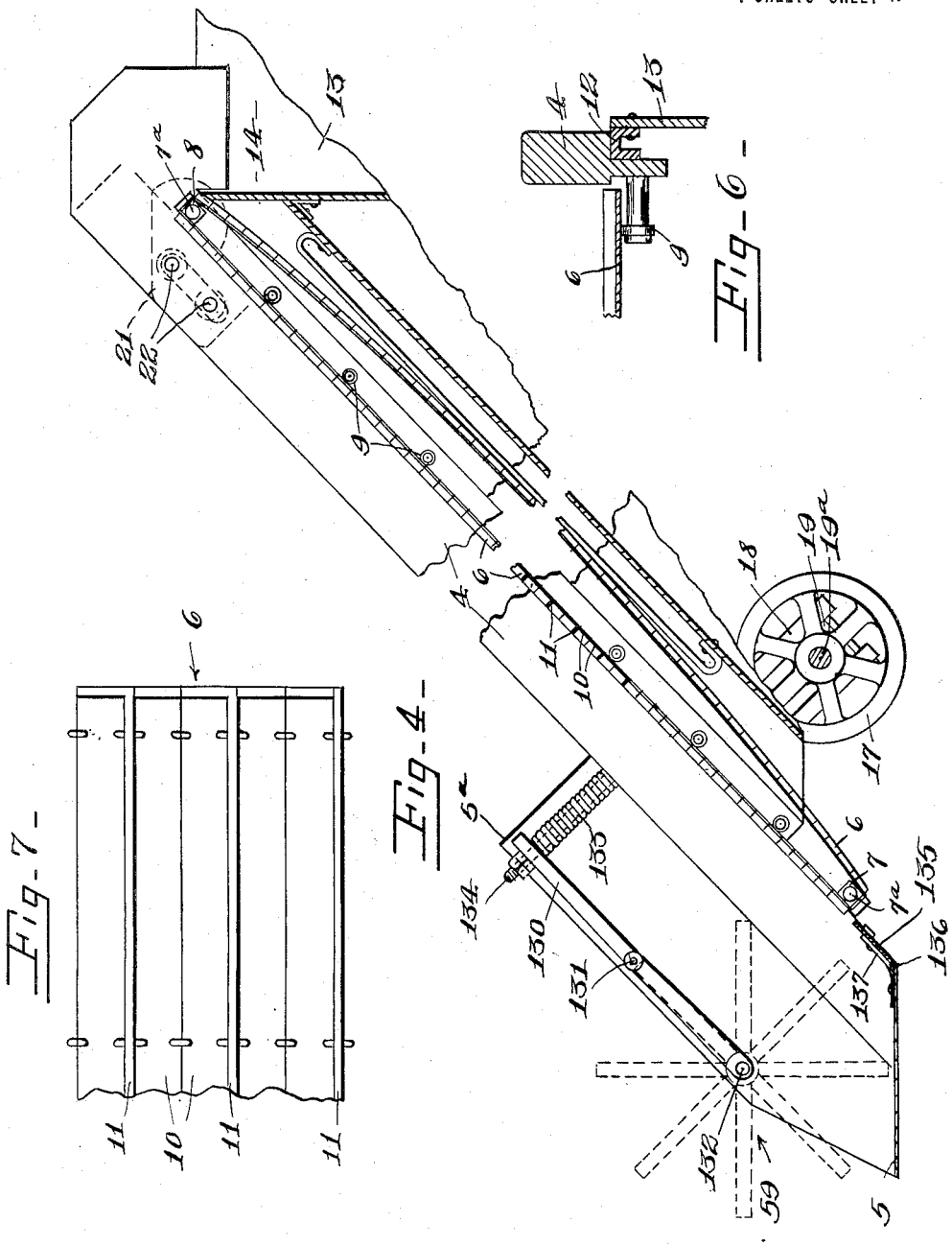

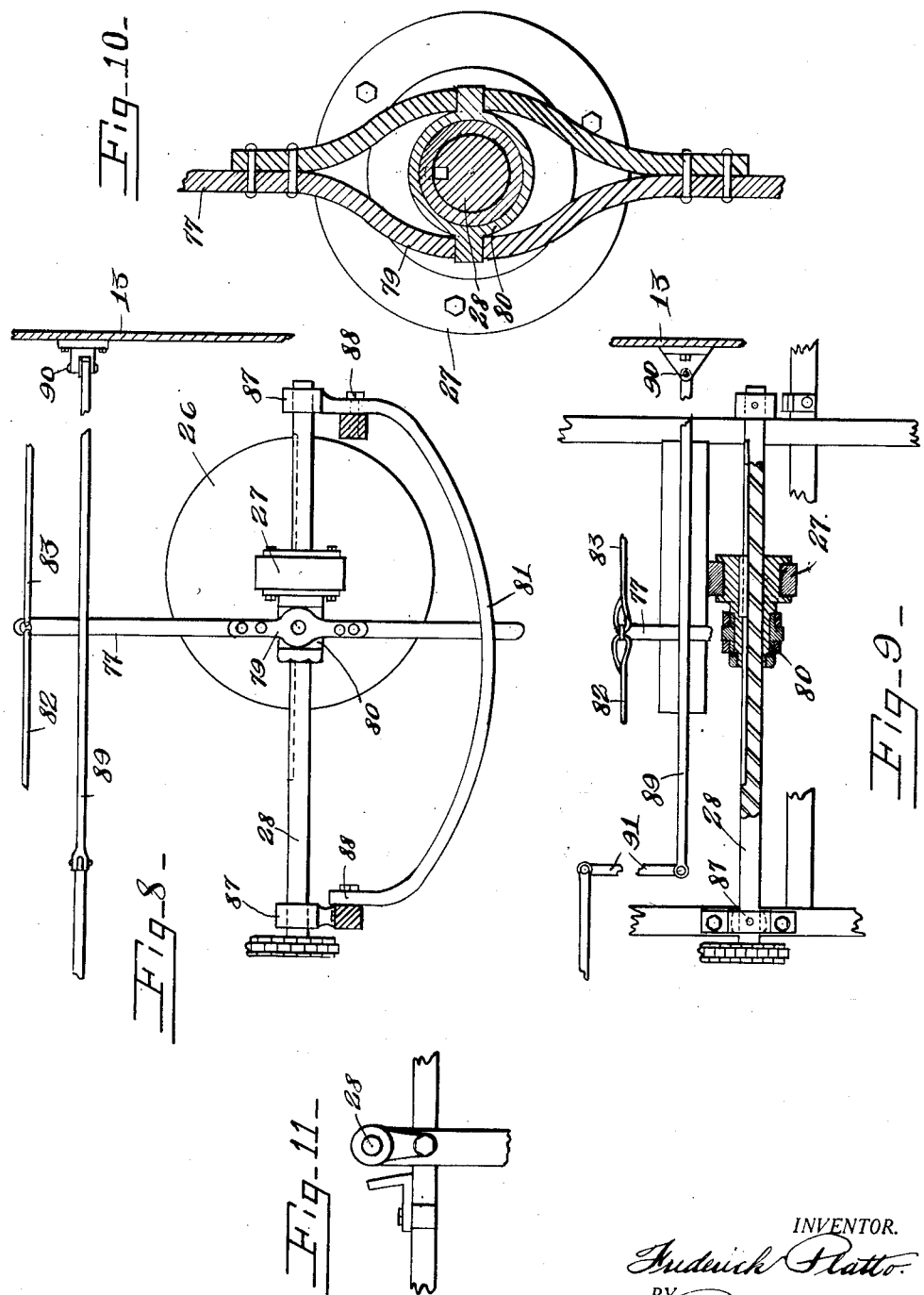

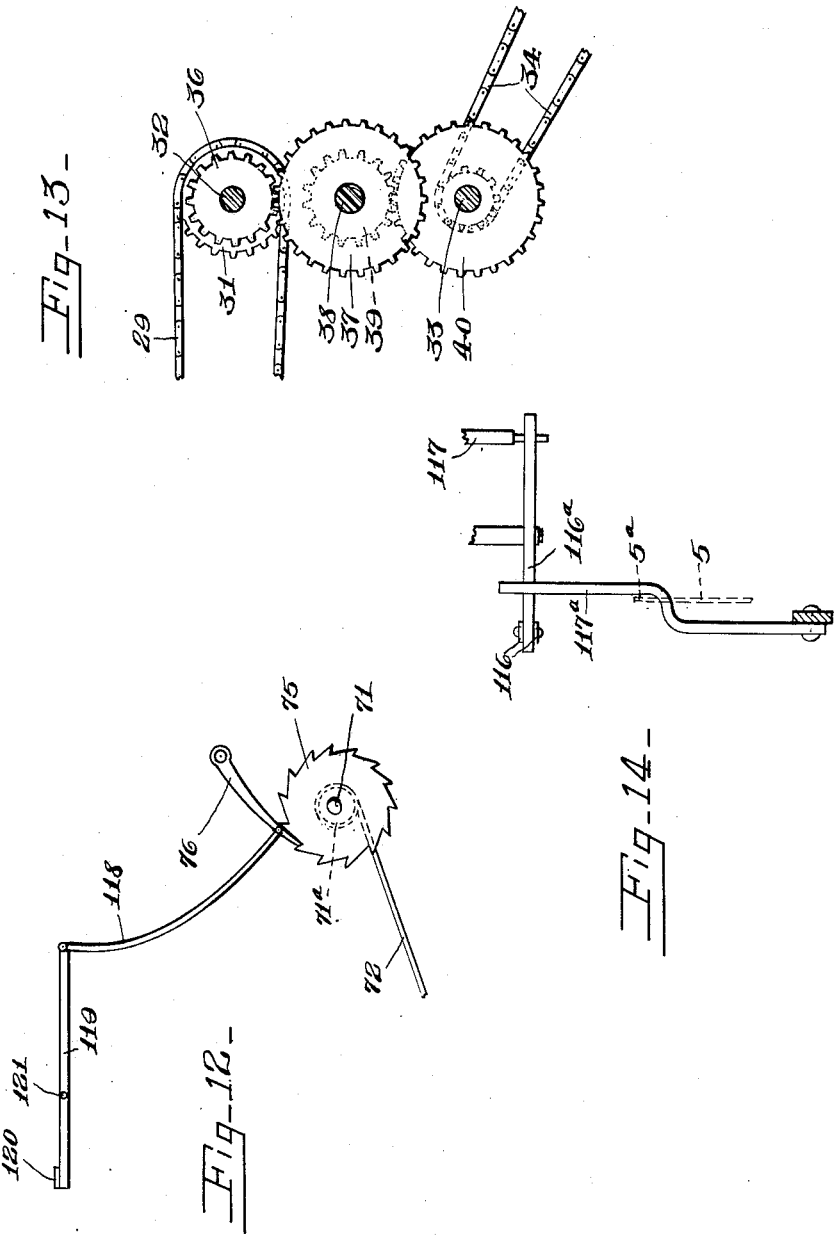

UNITED STATES PATENT OFFICE.

FREDERICK PLATTO, OF BREWERTON, NEW YORK.

MOTOR LOADING-MACHINE.

1,379,039.　　　　Specification of Letters Patent.　　Patented May 24, 1921.

Application filed June 6, 1919. Serial No. 302,277.

*To all whom it may concern:*

Be it known that I, FREDERICK PLATTO, a citizen of the United States, and a resident of Brewerton, in the county of Onondaga and State of New York, have invented a certain new and useful Motor Loading-Machine, of which the following is a specification.

This invention has for its object, a motor loading machine particularly applicable for cleaning roads and picking up and loading materials lying along the excavations, etc., which machine is particularly simple in construction, rapid in operation, and easily operated and controlled. The invention consists in the novel features and in the combinations, constructions and arrangements hereinafter set forth and claimed.

In describing this invention, reference is had to the accompanying drawings in which like characters designate corresponding parts in all the views.

Figure 1 is a left side elevation, partly in section, of one embodiment of my loading machine.

Fig. 2 is a right side elevation thereof, partly in section.

Fig. 3 is a plan view thereof, partly in section.

Fig. 4 is a detail view, partly in section, and partly in elevation, of the conveyer.

Fig. 5 is a detail view of the power plant and contiguous parts of the connections operated thereby.

Fig. 6 is a fragmentary detail view of the carrier and guide therefor.

Fig. 7 is a fragmentary plan view of the conveyer belt.

Figs. 8, 9, 10, 11, 12, 13 and 14 are detail views of the power transmitting connections between the power plant and the moving parts of the machine, as will be hereinafter more specifically pointed out.

This loading machine comprises generally, a supporting frame, as a truck, a conveyer mounted on the frame and inclining downwardly and terminating at its lower end in a scoop and a conveyer belt or movable apron carried by the conveyer frame, a power plant mounted on the frame beneath the rear portion of the conveyer, a platform mounted on the supporting frame or truck above the forward portion of the conveyer, power transmitting connections between the power plant and the driving wheels of the truck and between the power plant and the movable parts of the conveyer, and means for controlling the operations of said connections including handles located within reach of the platform.

1 designates the truck mounted upon front steering wheels and rear driving wheels 2 and 3. 4 is the conveyer frame supported on the truck frame and inclining downwardly and forwardly and terminating at its front end in front of the truck in a scoop or shovel 5. 6 is a conveyer belt or apron, movable in the bottom of the frame 4 over suitable rollers 7, 8 near the lower and upper ends of the frame and over a series of rollers 9 also carried by the frame 4. This conveyer includes a belt composed of sections 10, Fig. 7 linked together and having pockets or cleats 11 thereon. The conveyer belt may be of any suitable form, size and construction. The rollers 7 and 8 are squared and each side thereof is substantially the width of one of the sections of the conveyer belt.

In the illustrated form of my invention, the frame 4 is mounted to move upwardly and downwardly to carry the scoop 5 away from or toward the ground, and as here shown, said frame slides along suitable guides 12, Fig. 6, on which rests the lower edges of the vertical side members of the frame 4. The rollers 7 and 8 are carried on axles $7^a$ projecting inwardly from the sides of the frame 4, the guides 12 are angle irons mounted upon the inclined edges of framing mounted on the truck frame, this framing being inclosed by suitable sheeting 13, which forms a housing for the power plant to be presently described.

A hopper 14 is also mounted on this framing in the rear upper end of the conveyer in position to receive the material conveyed by the conveyer, the hopper having an outlet chute 15 at one side, which is controlled by a suitable gate 16. The conveyer frame 4 is provided at its lower end with suitable ground wheels 17 carried by brackets 18 depending from the frame 4 near the lower end thereof, the bearings 19 for the axles $19^a$ of said wheels being adjustable vertically in the brackets.

The roller 8 around which the conveyer belt runs, at the upper end of the conveyer frame 4 is mounted on the shaft $7^a$ carried in brackets 21, see Fig. 2, which are adjustable lengthwise of the frame 4 in order to tighten or loosen the conveyer belt, and said brackets are held in their adjusted positions by means of screws 22 or any other suitable fastening means.

23 is a power plant which is mounted on the truck frame beneath the rear or intermediate portion of the conveyer. This power plant preferably comprises an internal combustion engine and pertinent apparatus of any suitable form, size and construction. 24 is a platform mounted on the truck frame in any suitable manner and located above the forward portion of the conveyer in the rear of the scoop and on which the operator stands, all the controlling levers being located within reach of this platform; preferably, the platform is covered by a suitable cab 25.

The moving parts of this machine are operated from the motor 23.

The connections between the motor and the driving wheels in this embodiment of my invention comprises a gear as a friction gear 26 mounted on the front end of the crank shaft, see Figs. 3, 5, 9 and 10, a friction pinion 27 mounted on a shaft 28 extending crosswise of the truck frame and journaled in suitable bearings, the friction pinion slidably engaging the friction gear 26 and being movable radially over the face of the same and also toward and from the front of the same, a chain or belt 29 running over wheels 30 and 31 mounted respectively on the shaft 28 and on the shaft 32 located at the rear part of the frame, reducing gearing between the shaft 32 and a jack shaft 33 extending crosswise of the truck frame vertically beneath the shaft 32, and driving chains 34 running over sprockets mounted on opposite ends of the jack shaft 33 and over sprockets 35 mounted on the rear driving wheels 3. The reducing gearing comprises a gear 36, see Figs. 3 and 13, mounted on the shaft 32 and meshing with a gear 37 mounted on an intermediate idler shaft 38 located between the shafts 32 and 33, a gear 39 also mounted on the shaft 38 and meshing with a gear 40 on the jack shaft 33. Obviously, when the friction pinion 27 is engaged with the friction driving gear 26 on the engine crank shaft, the jack shaft 33 will be rotated in one direction or the other, depending on which side of the center of the driving friction gear 26 the pinion 27 is located, and the rear driving wheels will be driven thereby. A suitable compensating gear (not shown) is located within the gear 40 and the jack shaft 33 is in two sections connected to the opposing main gears of the differential as will be understood by those skilled in the art.

The connections for driving the conveyer belt 6 include clutch sections 41 and 42, Fig. 3, of any suitable form, size or construction, one section 41 of this clutch being mounted on the rear end of the crank shaft of the engine and the other section on the shaft 43 journaled at one end at 44 in the frame and at its other end in any suitable manner in the end of the crank shaft. Said connections further include a bevel pinion 45 mounted on the shaft 43 and meshing with the bevel gear 46 mounted on a shaft 47 extending crosswise of the frame and journaled in suitable bearings thereon, the shaft extending beyond the right side of the frame, a wheel 48 mounted on the outer end of the shaft, see Fig. 2, and a belt or chain 49 running over the wheel 48 and over a wheel 50 mounted on a shaft 51, Figs. 1 and 2, carried in suitable bearings 52 mounted on the sides of the conveyer frame 4, a gear 53 mounted on the shaft 51 and meshing with the gear 54 mounted on a shaft 55 carried in bearings 56 also supported by the side members of the conveyer frame, and a chain or belt 56$^a$ running over wheels as sprocket wheels 57 and 58, mounted respectively on the shaft 55 and on the axle 7$^a$ for the roller at the rear upper end of the conveyer belt. The chain 49 is mounted on the sprocket wheels with sufficient looseness to permit the up and down movement of the conveyer.

My machine is also provided with a rotary loader 59 carried at the lower end of the conveyer frame 4 above the scoop and rotatable to load the matter on the scoop as the scoop is being pushed into a pile of earth or other matter to be loaded. This loader is a rotary rake and is driven from the shaft 51 by means of a belt or chain 60 running over sprocket wheels 61 and 62 mounted respectively on the shaft 51 and on the axle for the rotary rake 59.

The connections between the engine and the conveyer frame 4 for moving the same upwardly to carry the scoop away from the ground comprises a friction pinion 63, Fig. 3, mounted on a shaft 64 suitably carried by the frame, the pinion engaging the rear side of the friction gear 26, a belt 65 running over suitable wheels 66 and 67 mounted on the shaft 64 and on the shaft 68 extending crosswise of the frame and journaled in suitable bearings therein, one end of the shaft extending through the right hand side of the frame and having a gear 69 thereon, (Figs. 2 and 3) which meshes with a gear 70 mounted on a shaft 71 journaled in suitable bearings in the frame and extending crosswise of the frame and parallel to the shaft 68, a winding drum or windlass 71$^a$ mounted on and rotatable with the shaft 71, and cables 72 winding on opposite ends of the shaft and connected at their front ends to couplings 73 provided on the shaft 19$^a$ on which the ground wheels 17 are located. The shaft 64 on which the friction pinion 63 is mounted is pivoted at 74 to one of the side sills of the frame and movable forwardly and rearwardly on its pivot by means to be hereinafter described, to carry the friction pinion 63 into and out of engagement with the friction driving gear 26. When the friction pinion 63 is engaged with the friction gear 26, obviously the drum or windlass 71 will be rotated to wind the cable 72 thereon and slide the conveyer frame 4 upwardly along its inclined guide. The conveyer frame is held at any elevation to which it is adjusted by the windlass 71, by means of any suitable clutching means here shown as a ratchet wheel 75 mounted on the left hand end of the shaft 71, see Figs. 1, 3 and 12 and a pawl 76 coacting with the ratchet wheel, the pawl is moved into and out of engagement with the ratchet wheel by means to be presently described, and when it is disengaged from the ratchet wheel and the friction pinion 63 is also disengaged from the friction driving gear 26, the conveyer frame moves downwardly along its inclined guides by gravity and can be stopped at any point by permitting the pawl 76 to engage the ratchet wheel 75.

The connections for operating or shifting the friction pinion 27 along the gear 26 to vary the speed at which the ground wheels 3 are driven as here shown, comprises a lever 77, Figs. 3, 8, 9 and 10 extending crosswise of the shaft 28 and having a fork 79 between its ends which engages a suitable collar 80 secured to the friction pinion 27 and slidable therewith along the shaft 28, the lever 77 being fulcrumed at its lower end on a fulcrum 81 supported as hereinafter described. Said connections also include suitable means for swinging the lever 77 to the right or the left, this means being here shown as cables 82 and 83, connected to the upper end of the lever 77 and extending in opposite directions therefrom and running around suitable pulleys 84 and 85 on the right and left sides of the frame and then extending forwardly to the front end of the machine around pulleys 84ª and 85ª and then inwardly, the ends thereof being connected to the lower end of the laterally movable hand lever 86 mounted in a cab 25. Movement of the lever 86 in one direction shifts a friction pinion from central position shifts a friction pinion 27 in one direction radially on the gear 26 to cause the machine to be driven forwardly at different speeds and movement in the other direction from the central position, causing the lever 77 to shift the friction pinion 27 radially in the opposite direction over the face of the gear 26 and hence the direction in which the machine is driven can be reversed.

The bearings 87 for the shaft 28 are mounted to swing fore and aft in order to carry the friction pinion 27 into and out of engagement with the driving friction gear 26, and are here shown as pivoted at 88 to the fulcrum 81 for the lever 77, this fulcrum being in the form of a yoke connecting the bearings 87. The means for swinging the lever 77 fore and aft in order to move the shaft 28 and its bearings about the pivots 88 comprises a link 89, Figs. 3 and 9 pivoted at 90 on the left hand side of the frame and extending across and in front of the upper end of the lever 77, a link 91 connecting the free end of the lever 89 to one arm of a lever 92 pivoted between its ends at 93 to an inwardly extending bracket 94 on the frame, a link 95 connecting the outer arm of the lever 92 and extending forwardly along the right hand side of the machine, Fig. 2, and being connected at its front end at 96, to a lever 97 which is suitably connected at 98 to the lower end of a hand lever 99 movable fore and aft in the cab 25 above the platform 24. Movement of this lever 99 forwardly through the connections just described, pulls the lever 89 rearwardly against the upper end of the shifting lever 77 which in turn presses the friction pinion 27 against the driving gear 26 by moving the shaft 28 rearwardly about the pivots 88. When this lever 99 is released, the friction pinion automatically releases itself from engagement with the driving pinion 26 as there is now no force tending to hold it against the driving gear 26. Hence, the driving force to the rear wheels is discontinued.

The means for controlling the operations of the conveyer belt operates to shift the clutch section 41 into and out of engagement with the clutch 42 and comprises a shifting lever 101, see Fig. 5, pivoted at 102 at its lower end to the fixed point, a link 103 connecting the upper end of the lever 102 and one arm of a lever 103ª, see Fig. 3, pivoted at 104 to an inwardly extending bracket 105, a rod 106, pivoted to the other arm of the lever 103 and extending forwardly and connected in any suitable manner to a lever 107 located within the cab 25.

The means for shifting the friction pinion 63 into engagement with the rear face of the friction driving gear 26 for the purpose of raising the conveyer frame comprises a lever 108, Fig. 5, pivoted at 109 to the frame and extending around the shaft 64 which is movable horizontally about a pivot 74, a link 110 connecting the upper end of the lever 108 with the upper end of the rock arm 111 mounted on the rock shaft 112 supported in bearings 113, 114 mounted on the under side of the truck frame, a rock arm 115 mounted on the outer end of the shaft 112, a link 116 connecting the upper end of the rock shaft 115 to one end of a lever 116ª pivoted between its ends and having its other end connected to the lower arm of the hand lever 117 located in the cab. By moving the lever 117 in one direction the friction pinion 63 is held against the driving friction gear 26 and when the said force is released, the pinion 63 disengages itself from the driving gear 26, as there is no force tending to hold it in engagement with the driving gear.

Means is provided for controlling the downward movement of the conveyer frame 4 and as here shown, Figs. 3 and 5, comprises a brake surface 63ᵃ against which the friction pinion 63 is held by means of the lever 117.

Means is also provided for limiting the upward movement of the conveyer frame and as here shown, Figs. 2 and 14, comprises a lever 117ᵃ pivoted to one of the side members of the truck frame, and extending upwardly in front of one end of the lever 116ᵃ, said lever being actuated in one direction by a part 5ᵃ of the scoop 5.

Obviously, upward movement of the conveyer frame 4 to the desired maximum height causes the part 5ᵃ of the scoop to operate the lever 117ᵃ which in turn operates the lever 116 backwardly, thereby releasing the friction gear 63 from the gear 26.

The pawl 76 coacting with the ratchet wheel 75 to hold the conveyer frame in its elevated position, is moved out of operative position by means of a link 118, see Figs. 1 and 12, and a foot lever 119 pivoted to the platform and having a pedal 120 located above the platform, this lever being pivoted at 121 between its ends. Upon depression of the pedal 120 the link 118 is pulled upwardly and moves the pawl 76 out of engagement with the ratchet wheel 75, permitting the conveyer to move downwardly along its inclined guides.

The steering wheels 2 are operated by means of a steering post 122 mounted in the cab and a link 123 connecting a rock arm on the lower end of the steering post to the lever 124 mounted on the vertically extending rock shaft 125 having a rock arm 126 at its lower end which is connected by a rod 127 to the steering knuckle 128. The motion is transferred from one steering knuckle to the other in any suitable manner. This steering mechanism may be of any suitable form, size and construction.

The rotary rake 59 is mounted to yield upwardly and downwardly toward the scoop and as here shown the axle thereof is mounted on the front ends of the arms 130, Figs. 1 and 4, pivoted at 131 between their ends and carrying the axle 132 for the rotary rake at their front ends and having their rear ends acted upon by compression springs 133 encircling suitable posts 134 carried by the conveyer frame, the springs pressing upwardly on the rear ends of the levers 130.

In order to prevent any stones or other material which might remain in the conveyer 6 from stopping the machine as they engage the apron at the rear of the scoop, this apron 135 is mounted to yield upwardly, and as here shown it is hinged at 136 at its front edge to the rear edge of the scoop and is pressed downwardly by suitable springs 137. Hence, if anything caught in the conveyer engages the apron as the conveyer or belt passes around the lower roller 7 of the conveyer belt, this apron can yield and obstructions be carried upwardly on the conveyer instead of obstructing the conveyer or breaking the apron.

In operation, the operator stands in the cab and swings the switch lever 86 to the right; he then operates the lever 99 to throw the friction pinion 27 into engagement with the driving friction gear 26; causing the machine to move forwardly. He then operates the lever 117 and moves the clutch 42 into engagement with the clutch section 41 to cause the conveyer belt and the rake to be actuated. The truck can be guided by means of the steering wheel and also the conveyer frame can be raised and lowered by operating the lever 117 or the pedal 120, all of these various operating levers being located within reach of the operator on the platform. On account of the position of the platform, the work is in full view of the operator. The throttle levers and engine control levers are also located in the cab.

The material is conveyed upwardly to the hopper 14 from which it can be loaded into wagons through the gate 16.

This machine is particularly advantageous in that it is readily operable and on account of the arrangements of the parts, the work is in full view of the operator and all of the parts are within the control of the operator.

What I claim is:

1. In a motor loading machine, the combination of a truck, a conveyer mounted on the truck including a frame inclining downwardly and forwardly and terminating in a scoop at its lower end located in front of the truck, and a conveyer belt carried by said frame, a power plant mounted on the truck beneath the rear portion of the conveyer, connections between the power plant and the conveyer belt, a platform carried by the truck above the front portion of the conveyer, and means for controlling the operation of said connections including levers located on said platform, substantially as and for the purpose specified.

2. In a motor loading machine, the combination of a truck having driving and steering wheels, a conveyer mounted on the truck and including a frame inclining downwardly and forwardly and terminating in a scoop at its lower end and a conveyer belt carried by said frame, a power plant mounted on the truck beneath the rear portion of the conveyer, a platform carried by the truck above the front portion of the conveyer, connections between the power plant and the driving wheels of the truck, and connections between the power plant and the conveyer belt, means for controlling the operations of the connections, and means for operating the steering wheels of the truck, all of said means comprising handles mounted on the platform, substantially as and for the purpose set forth.

3. In a motor loading machine, the combination of a truck, a conveyer including a frame carried by the truck and inclining downwardly and forwardly and terminating in a scoop at its lower end, and a conveyer belt carried by the frame, the conveyer frame being movable upwardly and downwardly relatively to the truck to carry the scoop toward and from the ground, means for actuating the conveyer belt, and means for moving the conveyer frame, substantially as and for the purpose set forth.

4. In a motor loading machine, the combination of a truck having driving and steering wheels, a conveyer including a frame inclining downwardly and forwardly and terminating in a scoop at its lower end located in front of the truck, and a conveyer belt carried by said frame, the conveyer frame being movable upwardly and downwardly in an inclined plane relatively to the truck to carry the scoop toward and from the ground, a power plant mounted on the truck beneath the rear portion of the conveyer, a platform carried by the truck above the front portion of the conveyer, connections between the power plant and the conveyer frame to raise and lower said conveyer, connections between the power plant and the conveyer belt and means for operating the steering wheels of the truck, connections between the power plant and the driving wheels of the truck, and means for controlling the operations of said connections, both of said means including handles located within reach of the platform, substantially as and for the purpose described.

5. In a loading machine, the combination of a supporting frame, a conveyer including a frame inclining downwardly and terminating in a scoop at its lower end and having an apron hinged to the rear end of the scoop and projecting upwardly and rearwardly, a spring acting on the apron and tending to resist upward movement thereof, and a conveyer belt carried by the conveyer frame and having its lower end running near the rear edge of the apron, substantially as and for the purpose set forth.

6. In a loading machine, a supporting frame, a conveyer including a frame inclining downwardly and terminating in a scoop at its lower end, and a conveyer belt carried by the frame, a rotating loader mounted on the frame above the scoop, and means for yieldingly supporting the loader, whereby it may yield vertically relatively to the scoop, said means including a spring tending to press the loader downwardly, substantially as and for the purpose described.

7. In a loading machine, a supporting frame, a conveyer including a frame inclining downwardly and terminating in a scoop at its lower end, and a conveyer belt carried by the frame, a rotating loader mounted on the frame above the scoop, and means for supporting the loader including a lever pivoted to the conveyer frame, and a spring acting on the lever to resist movement thereof when the loader tends to move away from the scoop, substantially as and for the purpose specified.

8. In a motor loading machine, the combination of a truck, a conveyer including a frame carried by the truck and inclining downwardly, and terminating in a scoop at its lower end, and a conveyer belt carried by the frame, the conveyer frame being movable upwardly and downwardly relatively to the truck to carry the scoop toward and from the ground, means for actuating the conveyer belt, means for moving the conveyer frame, and means actuated by the conveyer frame for stopping the conveyer moving means at the desired maximum height, substantially as and for the purpose specified.

In testimony whereof, I have hereunto signed my name, at Brewerton, in the county of Onondaga and State of New York, this 3rd day of May, 1919.

FREDERICK PLATTO.